United States Patent [19]
Jang

[11] Patent Number: 5,951,439
[45] Date of Patent: Sep. 14, 1999

[54] AUTOMATIC TRANSMISSION HYDRAULIC CONTROL SYSTEM WITH SOLENOID-VALVE CONTROLLED SHIFT TIMING CONTROL VALVE

[75] Inventor: Jaeduk Jang, Kyungki-do, Rep. of Korea

[73] Assignee: Hyundai Motor Company, Seoul, Rep. of Korea

[21] Appl. No.: 08/919,370

[22] Filed: Aug. 28, 1997

[30] Foreign Application Priority Data

Aug. 30, 1996 [KR] Rep. of Korea .................. 96-36769

[51] Int. Cl.$^6$ ............................................... F16H 59/20
[52] U.S. Cl. .................. 477/133; 477/131; 477/132; 477/143; 475/128
[58] Field of Search ..................................... 477/127, 130, 477/131, 132, 133, 143, 155, 156; 475/128

[56] References Cited

U.S. PATENT DOCUMENTS

| | | | |
|---|---|---|---|
| 4,607,542 | 8/1986 | Sugano | 475/128 |
| 5,027,676 | 7/1991 | Fujiwara et al. | 477/156 X |
| 5,090,271 | 2/1992 | Hayasaki | 477/128 |
| 5,117,712 | 6/1992 | Goto et al. | 475/128 |
| 5,184,528 | 2/1993 | Mochizuki | 475/128 |

*Primary Examiner*—Rodney H. Bonck
*Assistant Examiner*—Ankur Parekh

[57] ABSTRACT

Disclosed is a hydraulic control system used in an automatic transmission for a vehicle which includes a plurality of friction elements associated with respective transmission speeds, a hydraulic pressure source, a hydraulic pressure regulating controller for controlling hydraulic pressure from the hydraulic pressure source to constant line pressure, a damper clutch controller for actuating a damper clutch of the torque converter by supplying hydraulic pressure fed from the pressure regulating controller to the torque converter, shift controller for selecting a shift mode by converting hydraulic pressure from the pressure regulating controller into drive pressure corresponding to each speed stage, a hydraulic pressure controller for controlling the drive pressure from the shift controller, and a hydraulic pressure distributor for suitably distributing hydraulic pressure from the hydraulic pressure controller to each friction element for each speed, wherein the hydraulic pressure distributor includes a shift timing control valve for supplying drive pressure to each friction element for second and fourth speeds, and a solenoid valve for controlling hydraulic pressure supply timing to said each friction element for the second and fourth speeds by exhausting control pressure for controlling the shift timing control valve in the fourth speed.

4 Claims, 5 Drawing Sheets

AUTOMATIC TRANSMISSION HYDRAULIC CONTROL SYSTEM WITH SOLENOID-VALVE CONTROLLED SHIFT TIMING CONTROL VALVE

FIELD OF THE INVENTION

The present invention relates to a hydraulic control system used in automatic transmissions for vehicles.

BACKGROUND OF THE INVENTION

Generally, a conventional automatic transmission for vehicles includes a torque converter, a multi-stage gear shift mechanism connected to the torque converter, and a plurality of friction elements actuated by hydraulic pressure for selecting a gear stage of the gear shift mechanism.

In such hydraulic control systems, hydraulic pressure generated by a hydraulic pump is supplied to friction elements and a plurality of control valves such that automatic shifting is realized in accordance with a driving state of the vehicle and engine throttle opening.

The above hydraulic control system generally comprises a pressure regulating controller for controlling hydraulic pressure generated by the hydraulic pump, a manual and automatic shift controller for selecting a shift mode, a hydraulic pressure controller for controlling shift response and shift quality for smoothly selecting a shift mode during shifting, a damper clutch controller for actuating a damper clutch of the torque converter, and a hydraulic pressure distributor which supplies an appropriate amount of hydraulic pressure to each of the friction elements.

The hydraulic pressure distributor distributes a variable amount of pressure in accordance with ON/OFF or duty control of solenoid valves by a transmission control unit such that shift control is realized.

When changing shift stages, the timing of exhausting hydraulic pressure from one set of friction elements and providing hydraulic pressure to another set of friction elements greatly influences shift quality. Further, when mistiming occurs, an abrupt increase in engine revolutions or locking of the shift mechanism can result.

In order to improve shift quality by accurately controlling the timing of pressure supply, a method of modifying shift valve structure has been developed. However, such a method complicates both the structure of the shift valves and the control process.

SUMMARY OF THE INVENTION

The present invention has been made in an effort to solve the above problems. It is an object of the present invention to provide a hydraulic control system used in automatic transmissions for vehicles which is able to prevent engine run-up and tie-up of the shift mechanism during the shifting process, and allow kickdown skip shifting and driver-induced skip shifting (i.e., by suddenly releasing an accelerator pedal).

To achieve the above object, the present invention provides a hydraulic control system used in automatic transmissions for vehicles. The system includes a plurality of friction elements associated with respective transmission speeds, a hydraulic pressure source, hydraulic pressure regulating means for controlling hydraulic pressure from the hydraulic pressure source to constant line pressure, damper clutch control means for actuating a damper clutch of the torque converter by supplying hydraulic pressure fed from the pressure regulating means to the torque converter, shift control means for selecting a shift mode by converting hydraulic pressure from the pressure regulating means into drive pressure corresponding to each speed stage, hydraulic pressure control means for controlling the drive pressure from the shift control means, and hydraulic pressure distributing means for suitably distributing hydraulic pressure from the hydraulic pressure control means to each friction element for each speed. The hydraulic pressure distributing means further comprises a shift timing control valve for supplying drive pressure to each friction element for second and fourth speeds, and a solenoid valve for controlling hydraulic pressure supply timing to said each friction element for the second and fourth speeds by exhausting control pressure for controlling the shift timing control valve in the fourth speed.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF PREFERRED EMBODIMENTS

Figure 1:
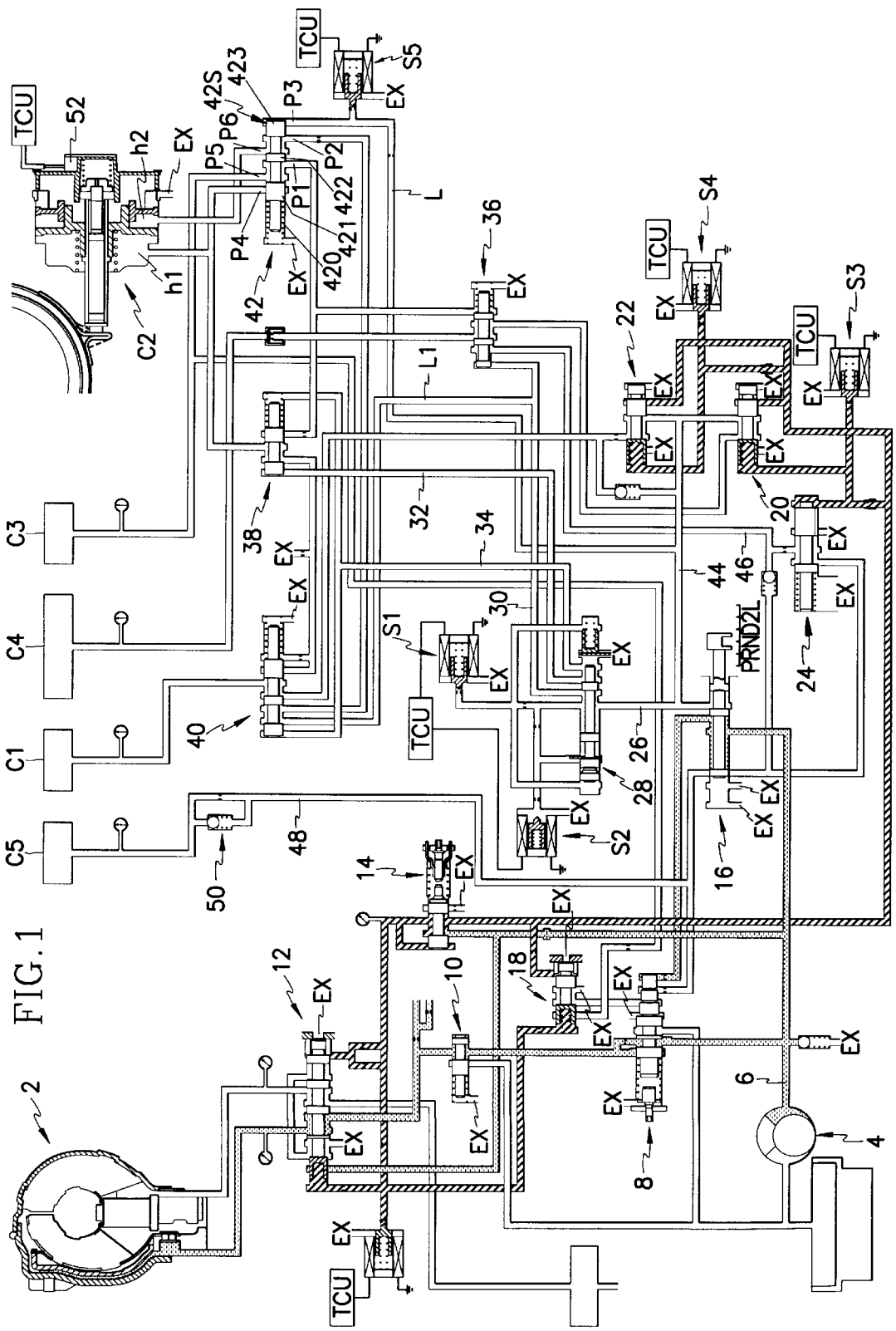
FIG. 1 is a hydraulic circuit diagram showing hydraulic pressure flow in a neutral N range of a hydraulic control system used in automatic transmissions according to a preferred embodiment of the present invention.
Figure 2:
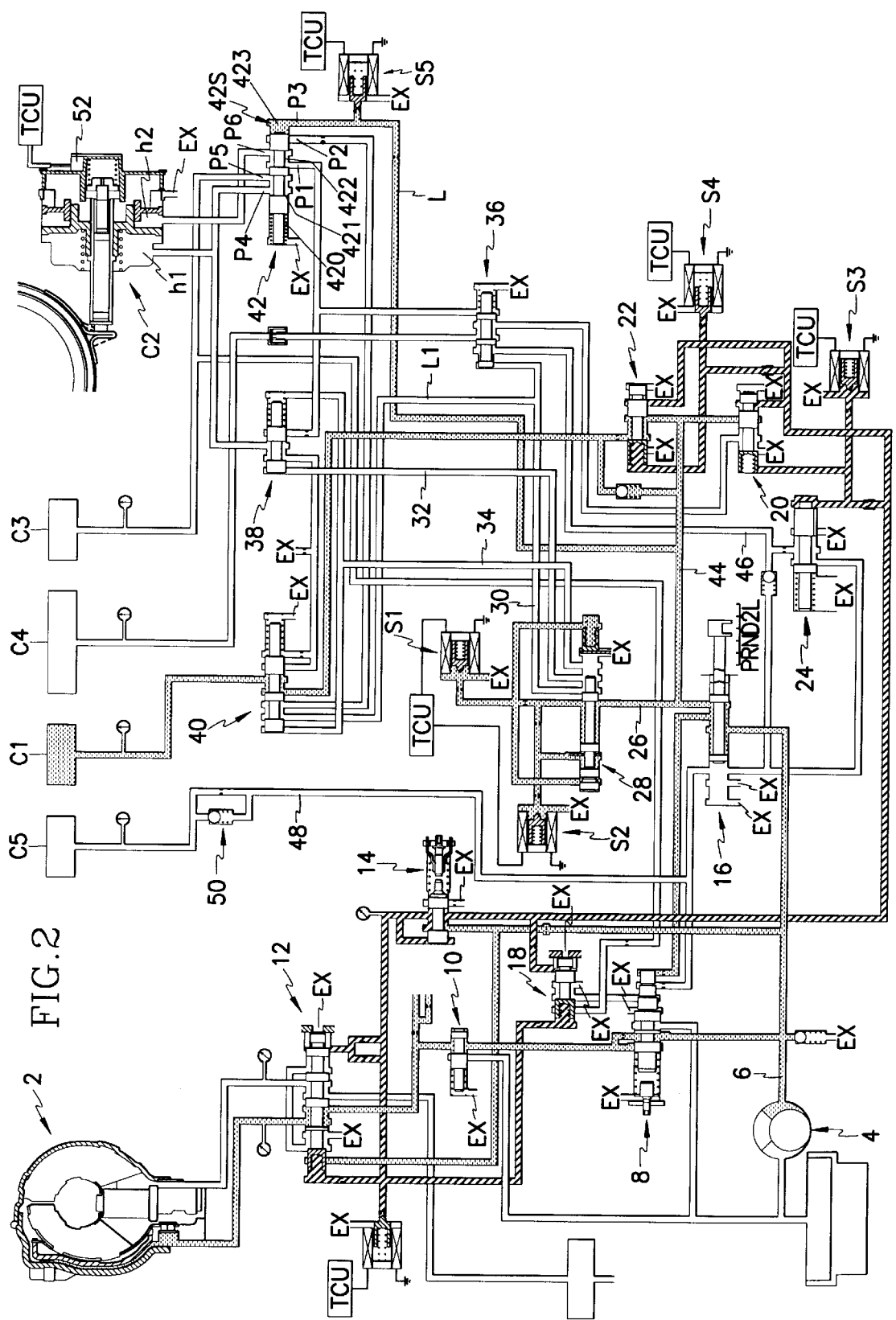
FIG. 2 is a hydraulic circuit diagram showing hydraulic pressure flow in a first speed of a drive D range of the hydraulic control system of FIG. 1.

Preferred embodiments of the present invention will now be described in detail with reference to the accompanying drawings.

Certain terminology will be used in the following description for convenience and reference only and will not be limiting. The words "right" and "left" will designate directions in the drawings to which reference is made.

FIG. 1 shows a hydraulic control system according to the present invention when a selector lever is positioned at a neutral N range.

The hydraulic control system includes a torque converter 2 connecting a crankshaft of an engine and an input shaft of a transmission system, and a hydraulic pump 4 for generating fluid for forming line pressure used to control the torque converter 2 and each shift operation, and fluid for lubricating parts of the transmission system.

The hydraulic control system further includes a pressure regulator and a damper clutch controller having a pressure regulator valve 8 for regulating line pressure to suitable levels and which is provided on a line 6 through which fluid supplied from the hydraulic pump 4 flows, a torque converter control valve 10 which regulates fluid pressure for the torque converter 2 and fluid for lubrication, and a damper clutch control valve 12 for controlling a damper clutch to improve power transmitting efficiency of the torque converter 2.

Further, a line is provided which supplies part of the fluid from the hydraulic pump 4 to a reducing valve 14 lowering hydraulic pressure to a level lower than line pressure, and to a manual valve 16 indexed by a selector lever to change flow direction of hydraulic pressure from the hydraulic pump 4.

Part of the hydraulic pressure reduced by the reducing valve 14 is used as control pressure of a high/low pressure valve 18 which acts to lower the line pressure when driving at high speeds such that power-loss of the hydraulic pump 4 is minimized, and another part of the hydraulic pressure is supplied to a first pressure regulating valve 20 and a second pressure regulating valve 22, both of which create shift control pressure.

In addition, part of the hydraulic pressure supplied to the first and second pressure regulating valves 20 and 22 is supplied as control pressure to an N-R control valve 24 which reduces shift shock when shifting from the neutral N range to the reverse R range.

The line 26, through which fluid flows when the manual valve 16 is positioned at the drive D range, is connected to a shift control valve 28 for selecting lines through which fluid flows in accordance with operation of first and second solenoid valves S1 and S2 ON/OFF-controlled by a transmission control unit (TCU). The manual valve 16 and the shift control valve 28 together constitute a manual and automatic shift controller.

A second speed line 30, a third speed line 32, and a fourth speed line 34 are connected to the shift control valve 28 such that control pressure is supplied to each shift valve of hydraulic distributor for controlling each shift stage.

Namely, the second speed line 30 is connected to a left side port of a 1-2 shift valve 36 to control the same, the third speed line 32 is connected to a left side port of a 2-3/4-3 shift valve 38 to control the same, and the fourth speed line 34 is connected to both a right side port of the 2-3/4-3 shift valve 38 and a left side port of a 2-4/3-4 shift valve 40 to control the same.

The first pressure regulating valve 20 changes its ports according to operation of a third solenoid valve S3, and the second pressure regulating valve 22 change its ports in accordance with operation of a fourth solenoid valve S4.

A first speed line 44 branched off from the line 26 extended from the manual valve 16 is connected to the first pressure regulating valve 20 and the second pressure regulating valve 22 to supply hydraulic pressure thereto. Further, the hydraulic pressures fed to the first and second pressure regulating valves 20 and 22 is supplied to a first friction element C1, acting as an input element in a first speed, via the 2-4/3-4 shift valve 40 by control of the third and fourth solenoid valves S3 and S4.

The first speed line 44 is connected to a timing control line L to enable the supply of line pressure to a shift timing control valve 42.

The shift timing control valve 42 comprises a valve spool 42S for controlling port conversion of this valve, and is provided with a first port P1 for receiving hydraulic pressure from the manual valve 16 via the first pressure regulating valve 20 and the 1-2 shift valve 36, a second port P2 for receiving hydraulic pressure from the manual valve 16 via the shift control valve 28 and the 2-4/3-4 shift valve 40, a third port P3 for receiving line pressure from the manual valve 16, and a fourth port P4 connected to a release chamber h1 of a second friction element C2 and the 2-3/4-3 shift valve 38. The shift timing control valve 42 is further provided with a fifth port P5 for supplying hydraulic pressure coming through the fourth or first port P4 or P1 to the third clutch C3, a sixth port P6 for supplying hydraulic pressure coming through the first port P1 or the second port P2 to an application chamber h2 of the second friction element C2. Part of hydraulic pressure flowing from the 2-3/4-3 shift valve 38 to the fourth port P4 is designed to feed to a release chamber h1.

The valve spool 42S comprises a first land 421, biased by an elastic member 420, for selectively communicating the fourth port P4 with the fifth port P5, a second land 422 for selectively communicating the first port P1 with the fifth or sixth port P5 or P6, and a third land 423, on which the control pressure coming through the third port P3 acts against elastic force of the elastic member 420, for selectively communicating the second port P2 with the sixth port P6, when the solenoid valve is controlled to an OFF state.

That is, the shift timing control valve 42 supplies/exhausts hydraulic pressure which actuates the third friction element C3 acting as an input element in third and fourth speeds, and controls a timing between when hydraulic pressure is supplied to the third friction element C3 and when the second friction element C2, acting as a reaction element in second and fourth speed, is controlled.

Such timing control is realized by a process in which the shift timing control valve 42 selectively supplies hydraulic pressure to the second and third friction elements C2 and C3 when a fifth solenoid valve S5 is controlled to OFF by the TCU.

Further, the hydraulic pressure from the first pressure regulating valve 20 is supplied to the second friction element C2, acting as a reaction element in the second speed, via the 1-2 shift valve 36.

Part of the hydraulic pressure passing through the 1-2 shift valve 36 is supplied to the third friction element C3, acting as an input element in the third speed, via the 2-3/4-3 shift valve 38 and the shift timing control valve 42, and part of the hydraulic pressure supplied to the third friction element C3 is supplied to a release chamber hl of the second friction element C2.

When the manual valve is positioned at the reverse R range, the hydraulic pressure supplied to a reverse first regulating line 46 is, in turn, supplied to a fourth friction element C4 acting as a reaction element in the reverse R range via the 1-2 shift valve 36, and the reverse second regulating line 48 is connected to the manual valve 16 to operate a fifth friction element C5 acting as an input element.

Provided on the reverse second regulating line 48 is a check valve 50 for delaying the exhausting of hydraulic pressure to improve shift quality.

A kickdown switch 52 is mounted to an application chamber h2 of the first friction element C2. The kickdown switch 52 turns OFF when hydraulic pressure is supplied to the application chamber h2 and turns ON when hydraulic pressure is supplied to the release chamber h1, the kickdown switch 52 transmitting the ON/OFF signal the TCU.

To realize skip shifting in which operational pressure of the second friction element C2 is controlled to flow through differing lines, the 2-4/3-4 shift valve 40 is provided with ports enabling the supply of hydraulic pressure from the shift timing control valve 42 to the second friction element C2.

Reference numeral S6, not yet described, in the drawings denotes a sixth solenoid valve which controls the damper clutch control valve 12 to engage or disengage the damper clutch.

In the hydraulic control system structured as in the above, when the selector lever is selected to the neutral N range, as shown in FIG. 1, hydraulic pressure is not able to be supplied from the manual valve 16 to the transmission gear mechanism, and part of the hydraulic pressure from the hydraulic pump 4 is supplied to the first and second pressure regulating valves 20 and 22 via the reducing valve 14.

Here, the third and fourth solenoid valves S3 and S4 duty-controlled by the TCU are controlled to OFF such that spools of the first and second pressure regulating valves 20 and 22 are moved to right.

In the above state, when the selector lever is shifted to the drive D range, part of the hydraulic pressure supplied to the manual valve 16 is supplied to the shift control valve 28 and the first and second pressure regulating valves 20 and 22. Here, as the first and second solenoid valves S1 and S2 of the shift controller are both controlled to ON, ports of the shift control valve 28 are maintained at their initial states.

Further, the hydraulic pressure supplied to the first and second pressure regulating valves 20 and 22 of the pressure regulator is supplied to the first friction element Cl, acting as an input element in first speed, through the second pressure regulating valve 22 and the 2-4/3-4 shift valve 40. This is able to be realized because the third solenoid valve S3 is duty-controlled to ON to block the hydraulic pressure from the first speed line 44.

Here, part of the hydraulic pressure passes through the line L branched off from the first speed line 44 to be supplied to a right side port of the shift timing control valve 42 such that a spool therein is moved to the left.

Figure 3:
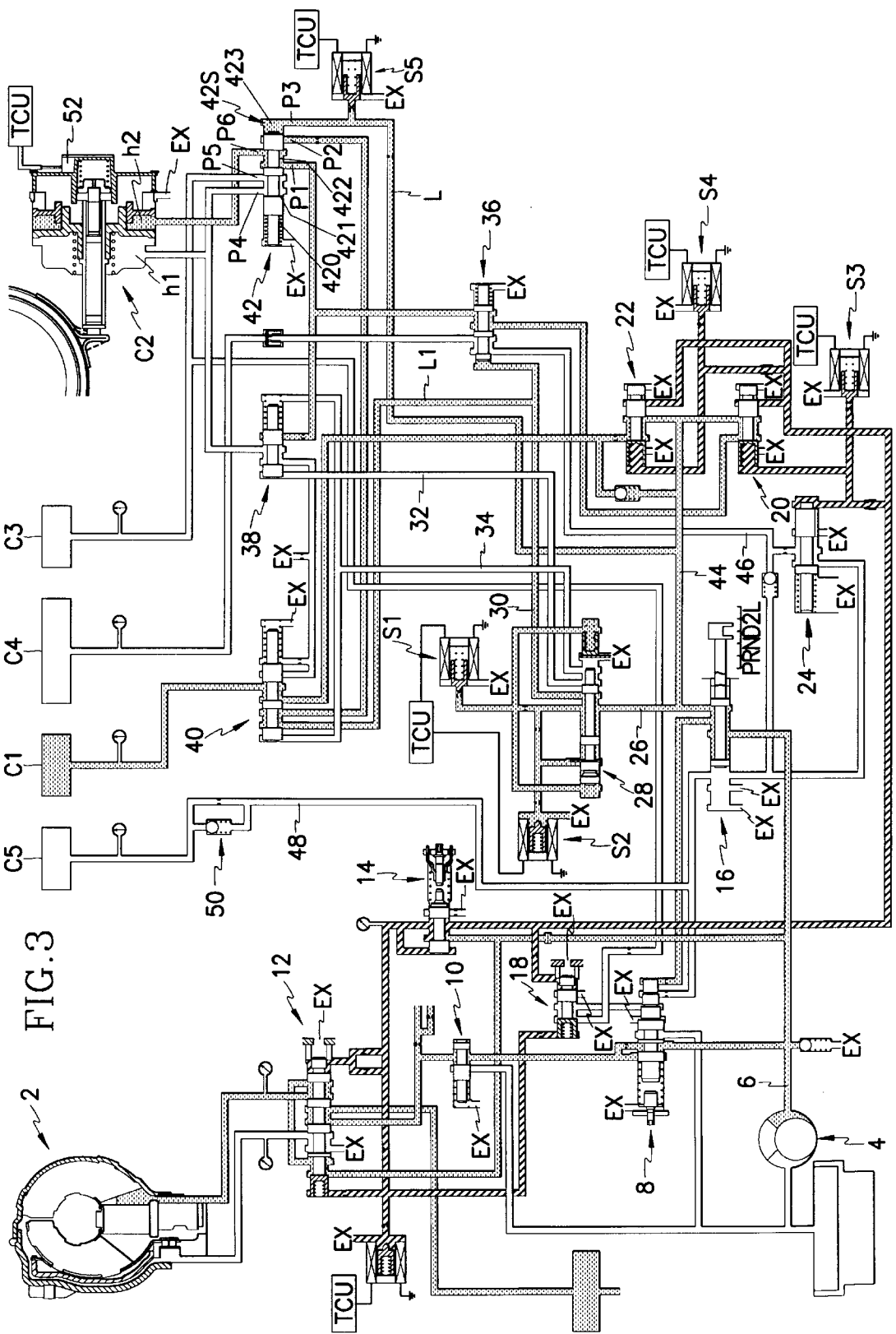
FIG. 3 is a hydraulic circuit diagram showing hydraulic pressure flow in a second speed of the drive D range of the hydraulic control system of FIG. 1.

In the above first speed state, if throttle opening is increased, the TCU controls the first solenoid valve S1 from OFF to ON to allow the hydraulic pressure supplied to the shift control valve to be supplied to the second speed line 30, as shown in FIG. 3. Also, the third solenoid valve S3 is controlled to OFF to supply the hydraulic pressure from the first speed line 44 to the application chamber h2 of the second friction element C2 via the 1-2 shift valve 36 and the shift timing control valve 42.

As a result, part of the hydraulic pressure passing through the 1-2 shift valve 36 is supplied to and stands by at the 2-3/4-3 shift valve 38, and through a line L1, branched off from the second speed line 30, second speed control pressure passes through the 2-4/3-4 shift valve 40 and stands by at the shift timing control valve 42, thereby completing control into the second speed.

Figure 4:
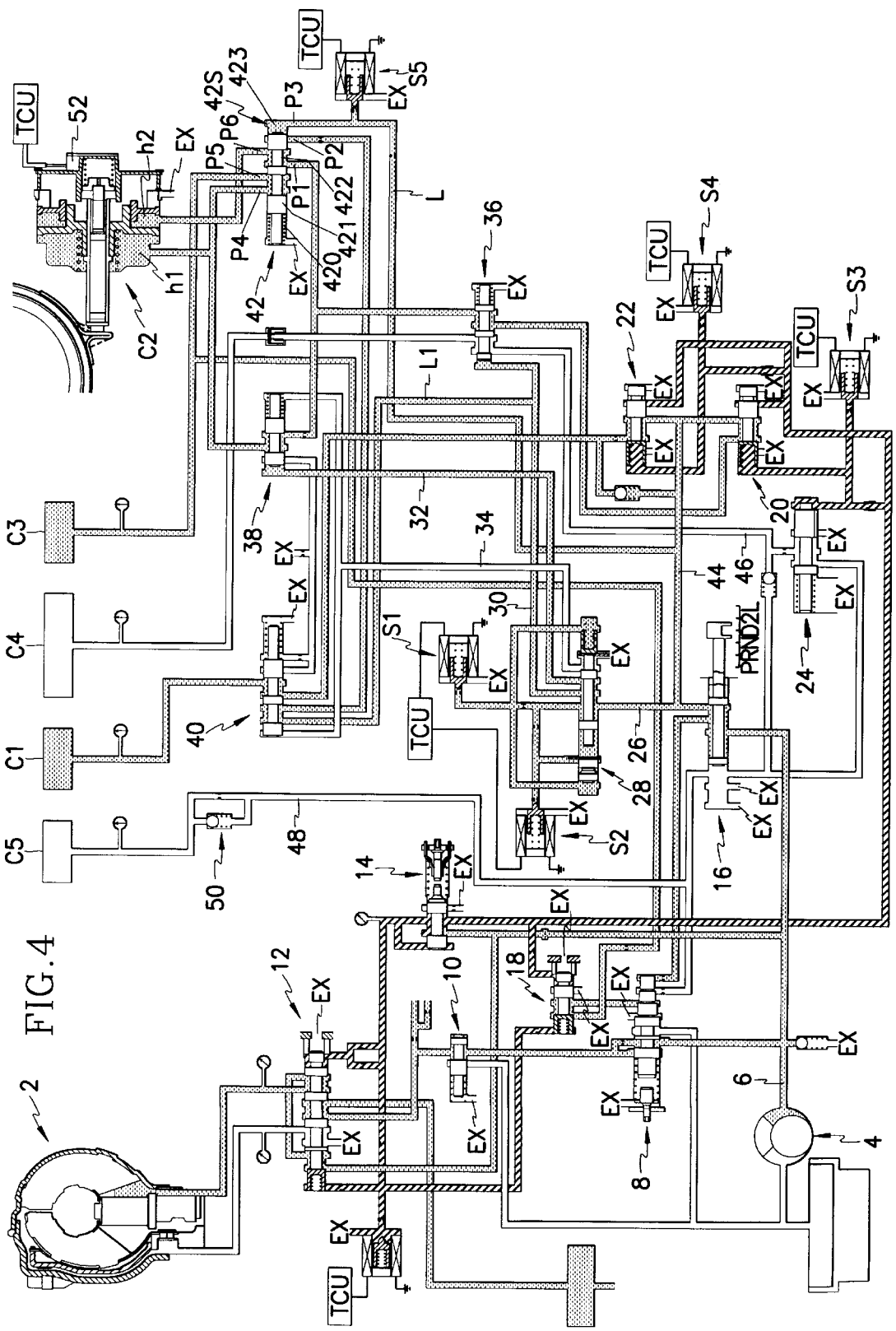
FIG. 4 is a hydraulic circuit diagram showing hydraulic pressure flow in a third speed of the drive D range of the hydraulic control system of FIG. 1.

In the above second speed state, if throttle opening is further increased, the TCU controls both the first and second solenoid valves S1 and S2 to OFF, as shown in FIG. 4.

Through the above control, hydraulic pressure flows in the second speed line 30 and a third speed line 32, the hydraulic pressure in the third speed line being supplied to a left side port of the 2-3/4-3 shift valve 38 such that a valve spool therein is moved to the right.

As a result, the hydraulic pressure standing by at the 2-3/4-3 shift valve 38 is supplied to the release chamber h1 of the second friction element C2 such that the second friction element C2 is released.

Simultaneously with the above, part of the hydraulic pressure supplied to the release chamber hl is supplied to the third friction element C3 via the shift timing control valve 42 to complete shifting into the third speed.

During the above third speed control, part of the hydraulic pressure supplied to the third friction element C3 is supplied to the high/low pressure valve 18 to control the regulator valve 8 such that line pressure is regulated. That is, line pressure is reduced such that power loss of the hydraulic pump 4 and fuel consumption are minimized when driving at high speeds.

Figure 5:
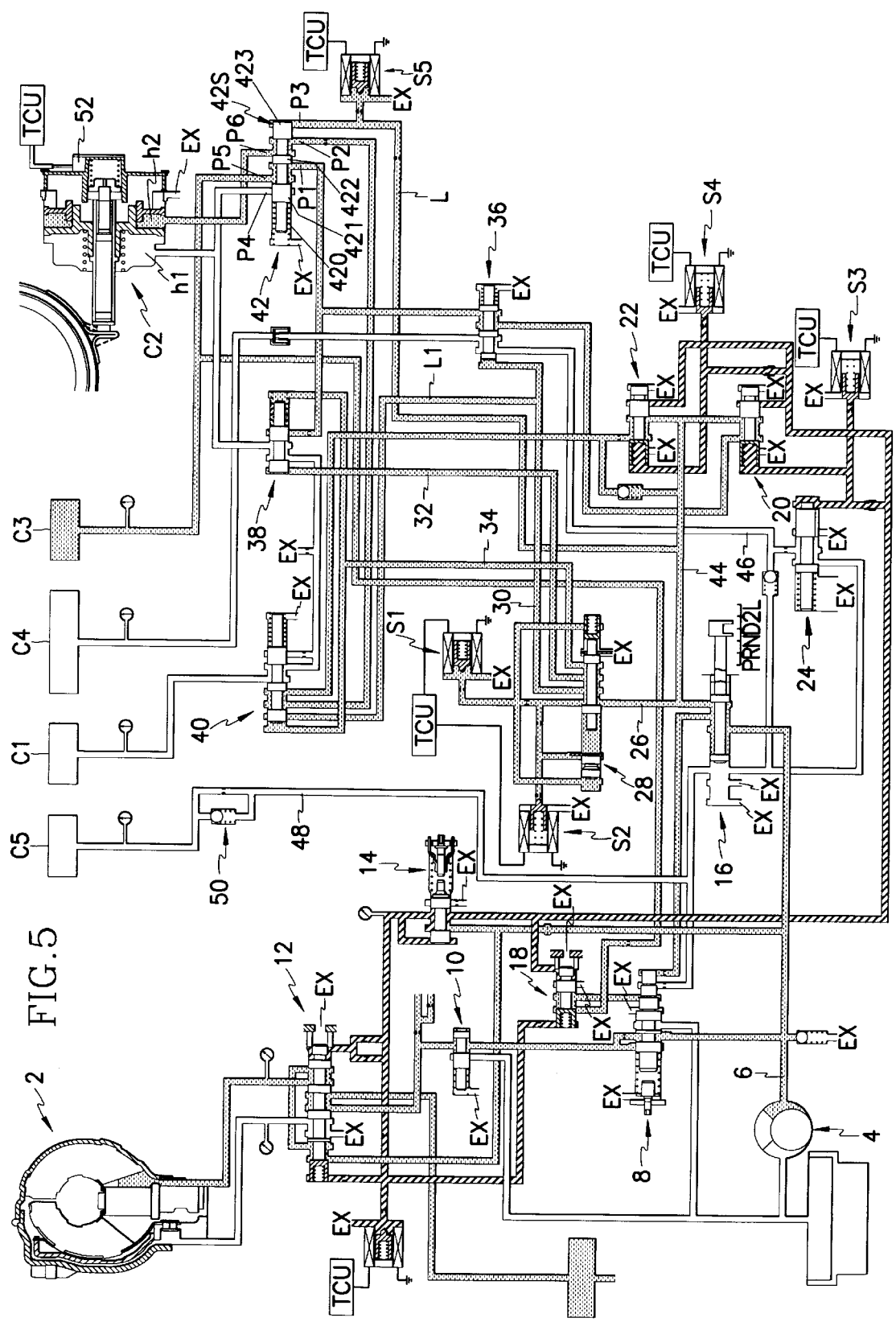
FIG. 5 is a hydraulic circuit diagram showing hydraulic pressure flow in a fourth speed of the drive D range of the hydraulic control system of FIG. 1.

In the above third speed control state, if throttle opening is further increased, the TCU controls the second solenoid valve S2 to OFF to allow hydraulic pressure to flow into second, third, and fourth speed lines 30, 32 and 34 as shown in FIG. 5.

The hydraulic pressure flowing along the fourth speed line 34 by the above control is supplied to a left side port of the 2-4/3-4 shift valve 40 and a right side port of the 2-3/4-3 shift valve 38 such that spools therein are moved to the right and left in the drawing, respectively.

Accordingly, the hydraulic pressure supplied to the first friction element C1 from the second pressure regulating valve 22 via the 2-4/3-4 shift valve 40 is blocked such that the hydraulic pressure is supplied to the second friction element C2 through the shift timing control valve 42.

In addition, the hydraulic pressure in the release chamber h1 of the second friction element C2 passes through the 2-3/4-3 shift valve 38 and is exhausted through an exhaust port Ex between the 2-3/4-3 shift valve 38 and the 2-4/3-4 shift valve 40.

In the hydraulic control system structured as in the above, if a 4-2 kickdown skip shift control signal is transmitted from the TCU, the first solenoid valve Si is controlled to OFF, the second solenoid valve S2 is controlled to ON, and the fifth solenoid valve S5 is controlled to OFF after shifting control is completed.

Also, the third and fourth solenoid valves S3 and S4 are duty-controlled to release operational pressure of the third friction element C3 and to supply operational pressure to the first friction element C1, thereby completing kickdown skip shifting from the fourth speed to the second speed.

If a 3-1 kickdown skip shift control signal is transmitted from the TCU, the first solenoid valve S1 is controlled to ON after shifting is completed, and the second solenoid valve S2 is controlled to ON.

Here, the fifth solenoid valve S5 is maintained in an OFF state, and the third solenoid valve S3 is duty-controlled to release hydraulic pressure in the application chamber h2 and the release chamber h1 of the second friction element C2, and application hydraulic pressure of the third friction element C3.

When releasing application pressure from each friction element as in the above, just before shifting is completed, hydraulic pressure is supplied to the application chamber h2 of the second friction element C2, then exhausted again. This process enables shift shock to be decreased which occurs when a one-way clutch reacts in the first speed stage.

If a 2-4 driver-induced skip shifting control signal is transmitted from the TCU, the first solenoid valve S1 is controlled from OFF to ON after shifting is completed, and the second solenoid valve S2 is controlled from ON to OFF.

At the same time, the fifth solenoid valve S5 is controlled from OFF to ON, and the third and the fourth solenoid valves S3 and S4 are duty-controlled to discontinue operation of the first friction element C1 and actuate the third friction element C3, thereby completing the driver-induced skip shifting from the second speed to the fourth speed.

As described above, in the hydraulic control system in accordance with a preferred embodiment of the present invention, in order to smoothly realize kickdown skip shift control from the fourth speed to the second speed, the fifth solenoid valve is provided to control the shift timing. Also, when skip shifting from the fourth speed to the second speed or from the second speed to the fourth speed, the application pressure of the second friction element is fixed to directly apply or release the first and third friction elements such that a clutch-to-clutch control method is able to be realized.

Further, when up-shifting from the third speed to the fourth speed, the operational line of the third friction element is converted.

As a result, because application pressure stands by at the shift timing control valve to prevent a reduction in hydraulic pressure, an improvement in shift quality is realized.

Other embodiments of the invention will be apparent to the skilled in the art from consideration of the specification and practice of the invention disclosed herein. It is intended that the specification and examples be considered as exemplary only, with the true scope and spirit of the invention being indicated by the following claims.

What is claimed is:

1. A hydraulic control system used in an automatic transmission including a plurality of friction elements associated with respective transmission speeds, comprising:

a hydraulic pressure source;

hydraulic pressure regulating means for controlling hydraulic pressure from said hydraulic pressure source so as to provide a constant line pressure;

shift control means for selecting a shift mode by converting hydraulic pressure from said hydraulic pressure regulating means into drive pressure corresponding to each speed stage;

hydraulic pressure control means for controlling said drive pressure from said shift control means; and hydraulic pressure distributing means for suitably distributing hydraulic pressure from said hydraulic pressure control means to respective friction elements for each speed;

wherein said hydraulic pressure distributing means comprises;

a shift timing control valve for supplying drive pressure to at least one applied friction element for a second and a fourth speed, respectively;

a solenoid valve for controlling said shift timing control valve so as to control hydraulic pressure supply timing to said at least one applied friction element for the second and fourth speeds; and a 1-2 shift valve, a 2-4/3-4 shift valve, and a 2-3/4-3 shift valve, wherein the shift timing control valve comprises a valve spool for controlling port conversion of this valve, and includes a first port for receiving hydraulic pressure from said shift control means via said 1-2 shift valve, a second port for receiving hydraulic pressure from said shift control means via said 2-4/3-4 shift valve, a third port for receiving line pressure from said shift control means, a fourth port for receiving hydraulic pressure from a release chamber of one of the friction elements acting as a reaction element in the second and fourth speeds, a fifth port for supplying hydraulic pressure coming through the fourth or first ports to one of the friction elements acting as an input element in a third speed, and a sixth port for supplying hydraulic pressure coming through the first port and the second port to an application chamber of the friction element acting as an input element in the third speed, through said hydraulic pressure distributing means.

2. The hydraulic control system of claim 1, wherein said solenoid valve is disposed to selectively exhaust the line pressure directed to the third port.

3. The hydraulic control system of claim 1, wherein part of hydraulic pressure flowing from said 2-3/4-3 shift valve to the fourth port is designed to feed to the release chamber.

4. The hydraulic control system of claim 1, wherein said valve spool comprises a first land, blased by an elastic member, for selectively communicating the fourth port with the fifth port, a second land for selectively communicating the first port with the fifth or sixth port, and third land, on which the control pressure coming through the third port acts against an elastic force of said elastic member, for selectively communicating the second port with the sixth port.

* * * * *